(12) United States Patent
Sasaki

(10) Patent No.: US 10,366,515 B2
(45) Date of Patent: Jul. 30, 2019

(54) IMAGE PROCESSING APPARATUS, IMAGE PROCESSING SYSTEM, AND NON-TRANSITORY COMPUTER READABLE MEDIUM

(71) Applicant: FUJI XEROX CO., LTD., Tokyo (JP)

(72) Inventor: Makoto Sasaki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/654,787

(22) Filed: Jul. 20, 2017

(65) Prior Publication Data

US 2018/0137654 A1    May 17, 2018

(30) Foreign Application Priority Data

Nov. 15, 2016 (JP) ................ 2016-222352

(51) Int. Cl.
| | |
|---|---|
| *G06T 7/00* | (2017.01) |
| *G06T 11/00* | (2006.01) |
| *G06T 3/00* | (2006.01) |
| *G06T 11/60* | (2006.01) |
| *G06T 7/11* | (2017.01) |
| *G06T 7/174* | (2017.01) |

(52) U.S. Cl.
CPC .......... *G06T 11/001* (2013.01); *G06T 3/0006* (2013.01); *G06T 7/11* (2017.01); *G06T 7/174* (2017.01); *G06T 11/60* (2013.01); *G06T 2207/20101* (2013.01); *G06T 2207/20104* (2013.01); *G06T 2207/20221* (2013.01)

(58) Field of Classification Search
None
See application file for complete search history.

(56) References Cited

U.S. PATENT DOCUMENTS

| | | | | | |
|---|---|---|---|---|---|
| 4,975,976 A | * | 12/1990 | Kimata | ................ | G06T 3/0006 375/E7.261 |
| 5,692,117 A | * | 11/1997 | Berend | ................ | G06T 11/001 345/475 |
| 5,864,342 A | * | 1/1999 | Kajiya | ................ | G06T 11/001 345/418 |
| 5,867,166 A | * | 2/1999 | Myhrvold | ............ | G06T 11/001 345/419 |
| 5,870,097 A | * | 2/1999 | Snyder | ................ | G06T 11/001 345/422 |
| 5,977,977 A | * | 11/1999 | Kajiya | ................ | G06T 11/001 345/418 |

(Continued)

FOREIGN PATENT DOCUMENTS

| | | |
|---|---|---|
| JP | 05-040833 A | 2/1993 |
| JP | 4917959 B2 | 4/2012 |

*Primary Examiner* — Martin Mushambo
(74) *Attorney, Agent, or Firm* — Sughrue Mion, PLLC

(57) ABSTRACT

An image processing apparatus includes a region detection unit, an image processing unit, and an image composing unit. The region detection unit detects a specified region from an original image. The image processing unit deforms a shape of a sample image that is an image serving as a sample in accordance with a shape of the specified region and deforms a texture of the sample image so as to express a depth corresponding to the specified region. The image composing unit overlays the deformed sample image on the specified region of the original image.

20 Claims, 14 Drawing Sheets

(56) References Cited

U.S. PATENT DOCUMENTS

| | | | | |
|---|---|---|---|---|
| 6,075,875 A * | 6/2000 | Gu | | G06T 9/001 |
| | | | | 375/E7.04 |
| 6,453,069 B1 * | 9/2002 | Matsugu | | G06K 9/48 |
| | | | | 382/173 |
| 7,283,140 B2 * | 10/2007 | Zhou | | G06T 15/04 |
| | | | | 345/419 |
| 7,529,429 B2 * | 5/2009 | Rother | | G06K 9/469 |
| | | | | 358/450 |
| 7,605,820 B1 * | 10/2009 | Rogers | | G06T 15/04 |
| | | | | 345/419 |
| 7,800,627 B2 * | 9/2010 | Zhou | | G06T 15/04 |
| | | | | 345/423 |
| 8,233,739 B1 * | 7/2012 | Cho | | G06T 11/60 |
| | | | | 345/582 |
| 8,355,592 B1 * | 1/2013 | Shechtman | | G06T 3/0093 |
| | | | | 345/419 |
| 9,633,444 B2 * | 4/2017 | Wang | | G06T 7/11 |
| 9,646,397 B2 * | 5/2017 | Nashizawa | | G06T 5/50 |
| 9,947,078 B2 * | 4/2018 | Amirghodsi | | G06T 3/0006 |
| 2002/0051572 A1 * | 5/2002 | Matsumoto | | G06K 9/4604 |
| | | | | 382/190 |
| 2005/0100195 A1 * | 5/2005 | Li | | G06K 9/00248 |
| | | | | 382/118 |
| 2005/0190986 A1 * | 9/2005 | Sakurai | | G06T 3/0006 |
| | | | | 382/275 |
| 2006/0017739 A1 * | 1/2006 | Fang | | G06T 11/001 |
| | | | | 345/582 |
| 2006/0098861 A1 * | 5/2006 | See | | G01B 11/08 |
| | | | | 382/145 |
| 2006/0170695 A1 * | 8/2006 | Zhou | | G06T 15/04 |
| | | | | 345/582 |
| 2006/0250670 A1 * | 11/2006 | Tsukioka | | G06T 11/001 |
| | | | | 358/518 |
| 2007/0092129 A1 * | 4/2007 | Sugiyama | | G06K 9/6203 |
| | | | | 382/145 |
| 2007/0229529 A1 * | 10/2007 | Sekine | | G06T 15/04 |
| | | | | 345/582 |
| 2008/0260219 A1 * | 10/2008 | Witte | | G16H 50/50 |
| | | | | 382/128 |
| 2009/0110239 A1 * | 4/2009 | Chen | | G06T 11/001 |
| | | | | 382/103 |
| 2010/0103435 A1 * | 4/2010 | Namikata | | G06T 3/0006 |
| | | | | 358/1.2 |
| 2014/0003690 A1 * | 1/2014 | Razeto | | G06T 7/0081 |
| | | | | 382/131 |
| 2014/0085293 A1 * | 3/2014 | Konoplev | | A63F 13/12 |
| | | | | 345/419 |
| 2014/0104295 A1 * | 4/2014 | Sorkine-Hornung | | G09G 5/00 |
| | | | | 345/589 |
| 2014/0341424 A1 * | 11/2014 | Reiter | | G06T 7/2033 |
| | | | | 382/103 |
| 2015/0023601 A1 * | 1/2015 | Hsu | | G06K 9/6201 |
| | | | | 382/190 |
| 2015/0278609 A1 * | 10/2015 | Wu | | G06K 9/00785 |
| | | | | 382/104 |
| 2015/0310673 A1 * | 10/2015 | Romdhani | | G06K 9/00275 |
| | | | | 345/420 |
| 2016/0103318 A1 * | 4/2016 | Du | | G02B 27/0068 |
| | | | | 345/633 |
| 2016/0261836 A1 * | 9/2016 | Saigo | | H04N 9/3185 |
| 2016/0292832 A1 * | 10/2016 | Bogan | | G06T 3/0075 |
| 2017/0308998 A1 * | 10/2017 | Wang | | G06T 7/11 |

\* cited by examiner

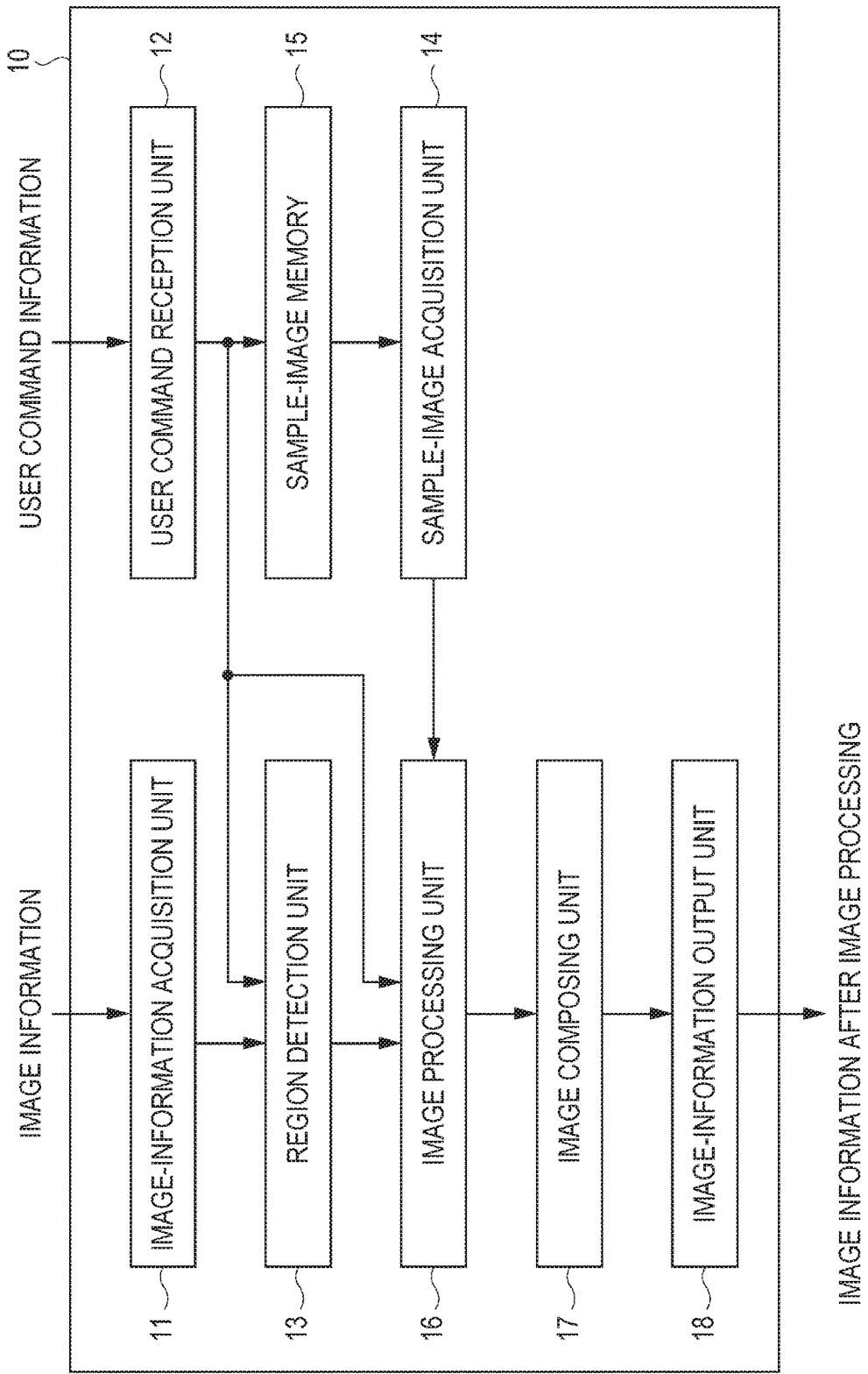

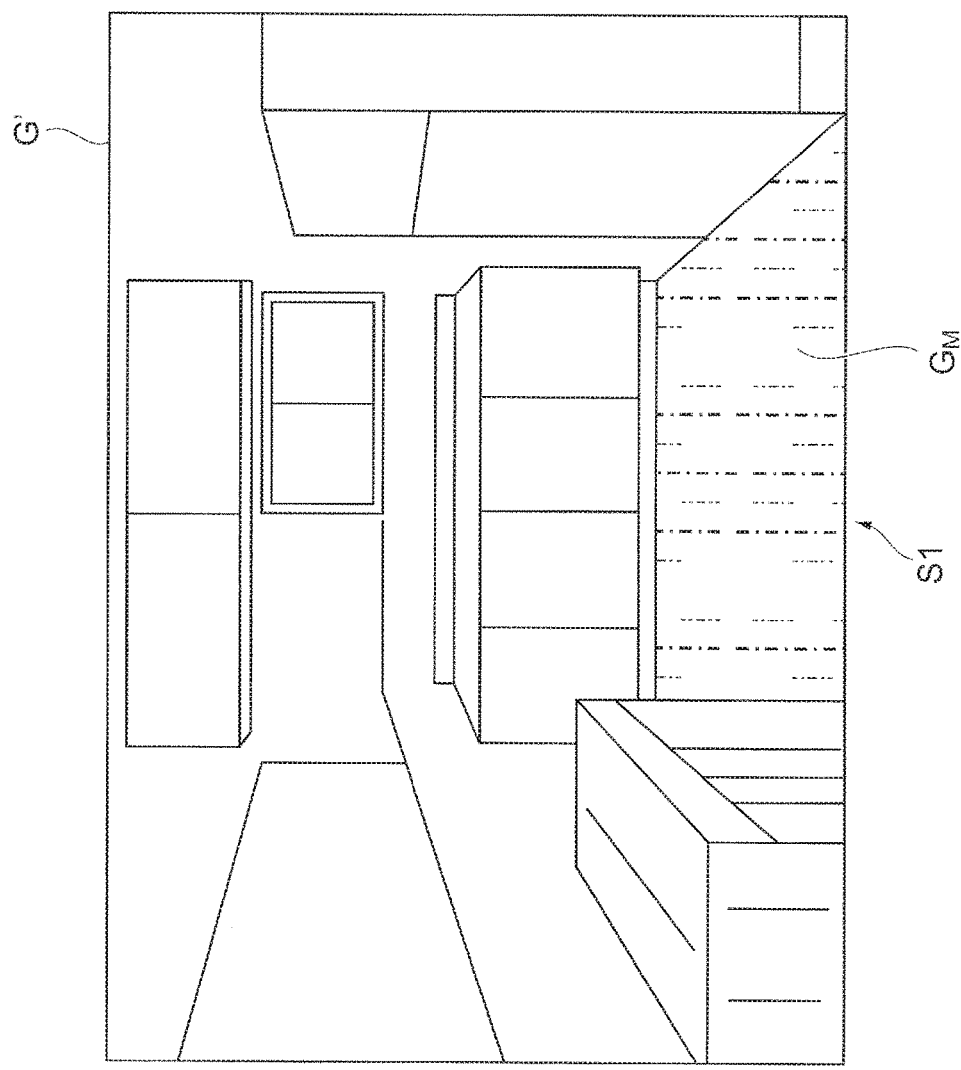

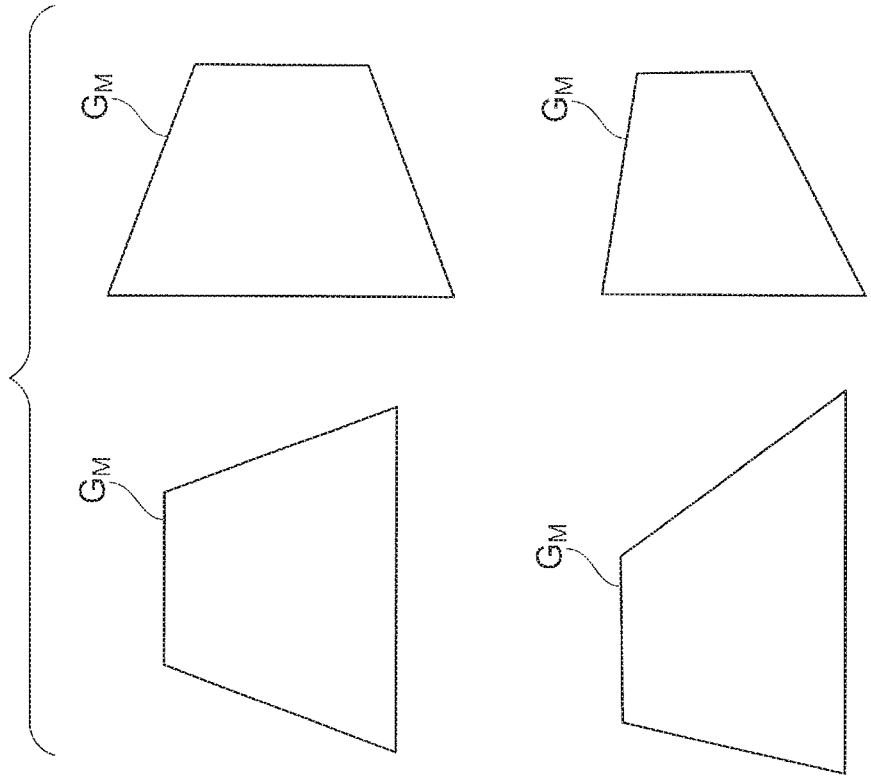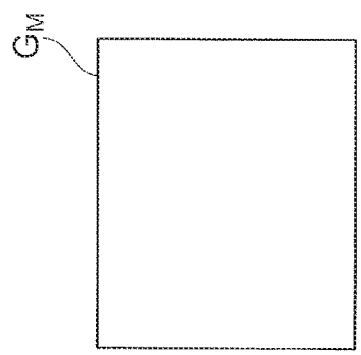

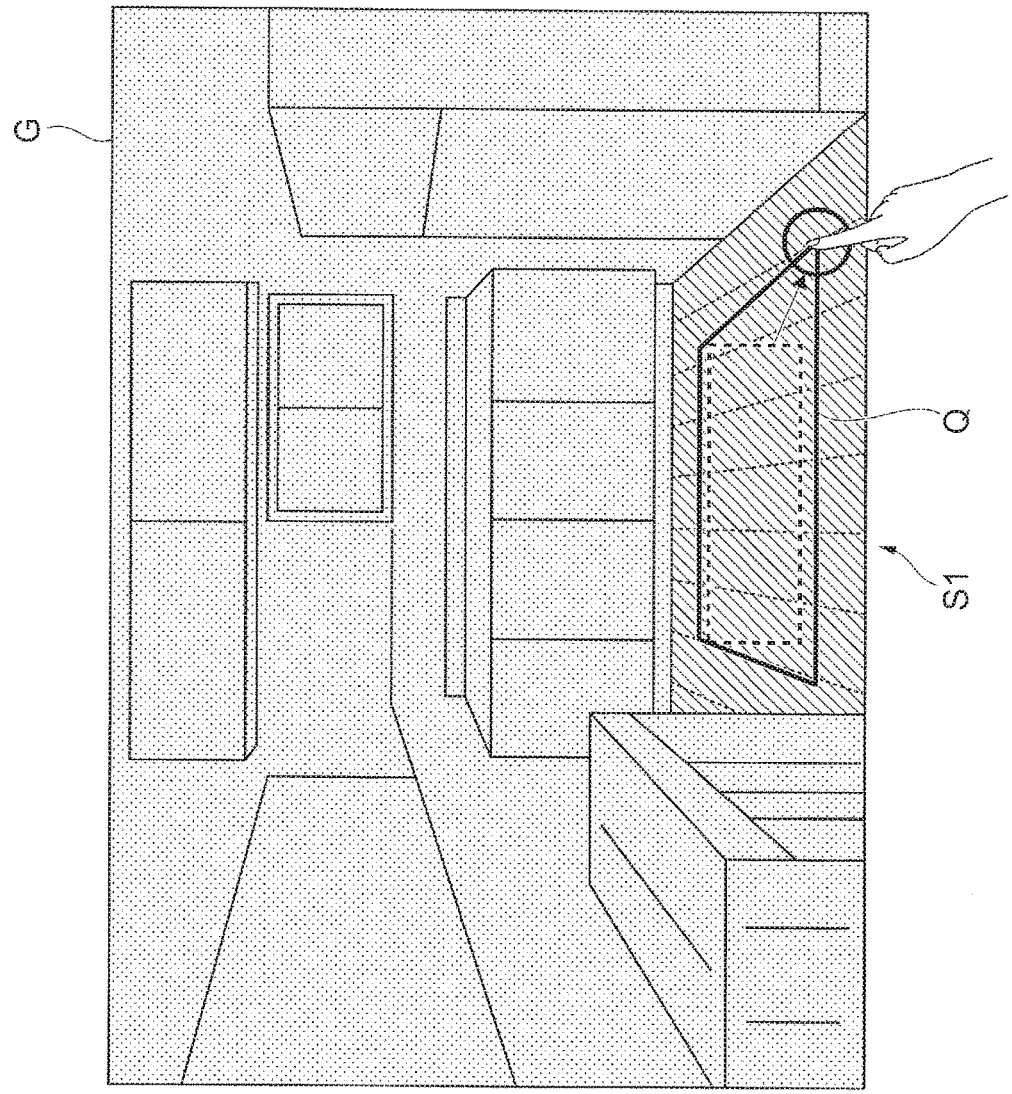

IMAGE PROCESSING APPARATUS, IMAGE PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-222352 filed Nov. 15, 2016.

BACKGROUND (i) Technical Field

The present invention relates to an image processing apparatus, an image processing system, and a non-transitory computer readable medium.

(ii) Related Art

In the field of image processing and reproduction, researches for improving image quality have been made so far using a technique for correcting the image quality of an entire image to an appropriate image quality or a technique for finishing a memory color such as the color of the skin of a person or the color of a landscape or the sky to a preferable color. In addition, researches for controlling texture that appeals to a person's perceptions or that is caused by a feeling other than the sense of sight such as a feeling of touch have recently been actively made.

SUMMARY

According to an aspect of the invention, there is provided an image processing apparatus including a region detection unit, an image processing unit, and an image composing unit. The region detection unit detects a specified region from an original image. The image processing unit deforms a shape of a sample image that is an image serving as a sample in accordance with a shape of the specified region and deforms a texture of the sample image so as to express a depth corresponding to the specified region. The image composing unit overlays the deformed sample image on the specified region of the original image.

BRIEF DESCRIPTION OF THE DRAWINGS

An exemplary embodiment of the present invention will be described in detail based on the following figures, wherein:

FIG. 2 is a block diagram illustrating an example of a functional configuration of an image processing apparatus according to the present exemplary embodiment;

FIG. 6 illustrates an example of a composite image obtained by overlaying a sample image on a specified region of an image using an existing method;

FIGS. 8A to 8B are diagrams in which a pre-projective-transformation sample image is compared with post-projective-transformation sample images;

FIG. 10 is a diagram illustrating the case where four vertexes of a reference rectangle are directly moved through dragging of a mouse or through swiping using for example the user's finger or a touch pen;

DETAILED DESCRIPTION

In the following, an exemplary embodiment according to the present invention will be described in detail with reference to the attached drawings.

Description of Entire Image Processing System

Figure 1:
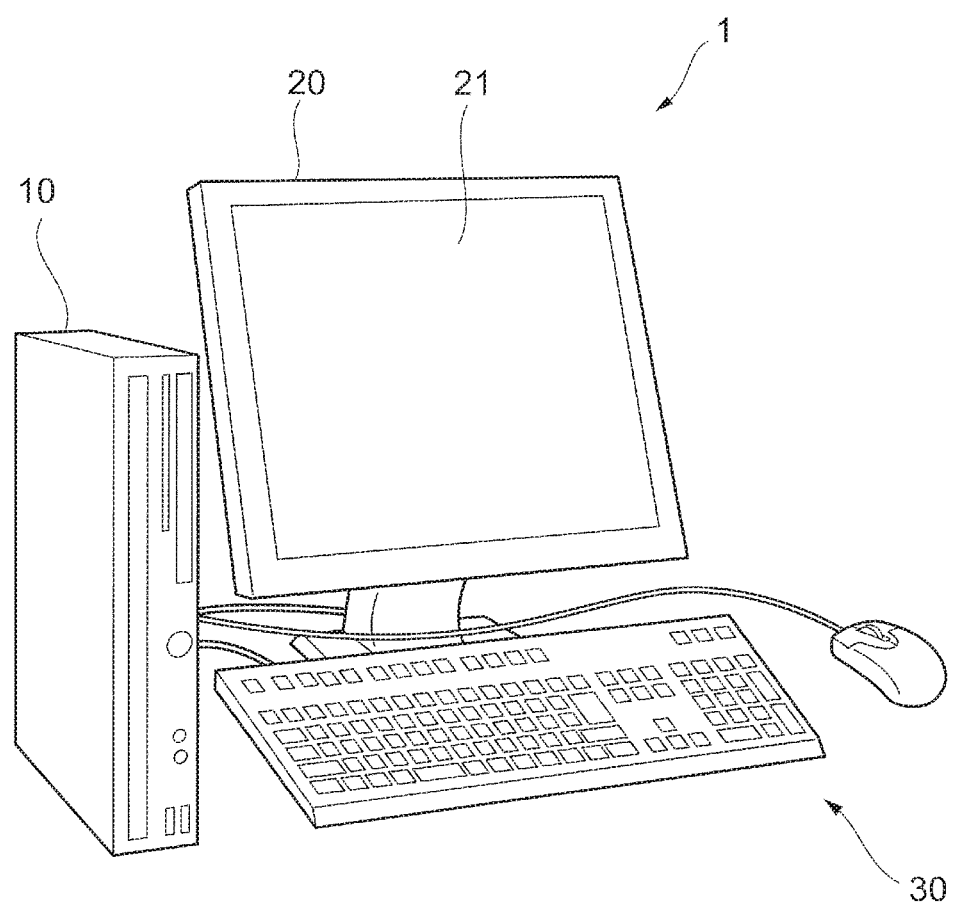
FIG. 1 is a diagram illustrating an example of the configuration of an image processing system according to the present exemplary embodiment.

FIG. 1 is a diagram illustrating an example of the configuration of an image processing system 1 according to the present exemplary embodiment.

As illustrated in FIG. 1, the image processing system 1 according to the present exemplary embodiment includes an image processing apparatus 10, a display apparatus 20, and an input device 30. The image processing apparatus 10 performs image processing on image information regarding an image displayed by the display apparatus 20. The display apparatus 20 receives the image information generated by the image processing apparatus 10 and displays an image on the basis of this image information. Using the input device 30, a user inputs various types of information to the image processing apparatus 10.

The image processing apparatus 10 is, for example, a so-called all-purpose personal computer (PC). The image processing apparatus 10 for example generates image information by causing various types of application software to operate under the management of an operating system (OS).

The display apparatus 20 displays an image on a display screen 21. The display apparatus 20 includes a device having a function for displaying images using an additive process such as a liquid crystal display for PCs, a liquid crystal television, or a projector. Thus, a display system used in the display apparatus 20 is not limited to a liquid crystal system. Note that the display screen 21 is provided within the display apparatus 20 in the example illustrated in FIG. 1; however, when for example a projector is used as the display apparatus 20, the display screen 21 is a screen or the like provided outside the display apparatus 20.

The input device 30 includes, for example, a keyboard or a mouse. The input device 30 is used to start up or end application software for performing image processing, or is used by the user to input a command to perform image processing to the image processing apparatus 10 in the case of performance of image processing, details of which will be described later.

The image processing apparatus 10 and the display apparatus 20 are connected via Digital Visual Interface (DVI). Note that the image processing apparatus 10 and the display apparatus 20 may be connected via, for example, High-Definition Multimedia Interface (HDMI®) or DisplayPort instead of DVI.

The image processing apparatus 10 and the input device 30 are connected via, for example, Universal Serial Bus (USB). Note that the image processing apparatus 10 and the input device 30 may be connected via, for example, IEEE1394 or RS-232C instead of USB.

In the image processing system 1 as above, the display apparatus 20 first displays an original image that is an image before being subjected to image processing. When the user inputs, using the input device 30, a command to perform image processing to the image processing apparatus 10, the image processing apparatus 10 performs image processing on image information regarding the original image. A result of this image processing is reflected in the image displayed by the display apparatus 20, and the display apparatus 20 redraws and displays the resulting image after the image processing.

Note that the image processing system 1 according to the present exemplary embodiment is not limited to the embodiment illustrated in FIG. 1. For example, the image processing system 1 may be a tablet terminal. In this case, the tablet terminal has a touch panel and this touch panel displays an image and receives a command from the user. That is, the touch panel serves as the display apparatus 20 and the input device 30. Likewise, a touch monitor may also be used as an apparatus serving as a combination of the display apparatus 20 and the input device 30. The touch monitor uses a touch panel as the display screen 21 of the display apparatus 20. In this case, the image processing apparatus 10 generates image information, and the touch monitor displays an image on the basis of this image information. The user inputs a command to perform image processing by, for example, touching this touch monitor.

Description of Image Processing Apparatus

FIG. 2 is a block diagram illustrating an example of a functional configuration of the image processing apparatus 10 according to the present exemplary embodiment. Note that FIG. 2 illustrates functions that are selected from among various functions of the image processing apparatus 10 and that are related to the present exemplary embodiment.

As illustrated in FIG. 2, the image processing apparatus 10 according to the present exemplary embodiment includes an image-information acquisition unit 11, a user command reception unit 12, a region detection unit 13, a sample-image acquisition unit 14, a sample-image memory 15, an image processing unit 16, an image composing unit 17, and an image-information output unit 18.

The image-information acquisition unit 11 acquires image information regarding an image on which image processing is to be performed. That is, the image-information acquisition unit 11 acquires image information regarding an original image before being subjected to image processing. The image information is for example red, green, and blue (RGB) video data (RGB data) for performing display at the display apparatus 20.

The user command reception unit 12 is an example of a position information acquisition unit and receives a command input through the input device 30 by the user and regarding image processing.

Specifically, the user command reception unit 12 receives, as user command information, a command to specify a specified region specified as a specific image region by the user in an image displayed by the display apparatus 20. In this case, the specific image region is an image region on which the user performs image processing. In actuality, the user command reception unit 12 acquires, as the user command information, position information indicating a representative position of the specified region input by the user in the present exemplary embodiment.

The user command reception unit 12 receives, as the user command information, a command to select a sample image from the user, which will be described in detail later. Furthermore, the user command reception unit 12 receives, as the user command information, a command regarding processing performed by the image processing unit 16 and to deform the selected sample image.

The present exemplary embodiment uses a method for user-interactively performing an operation for specifying a region as a specified region, the method being described in the following.

Figure 3A:
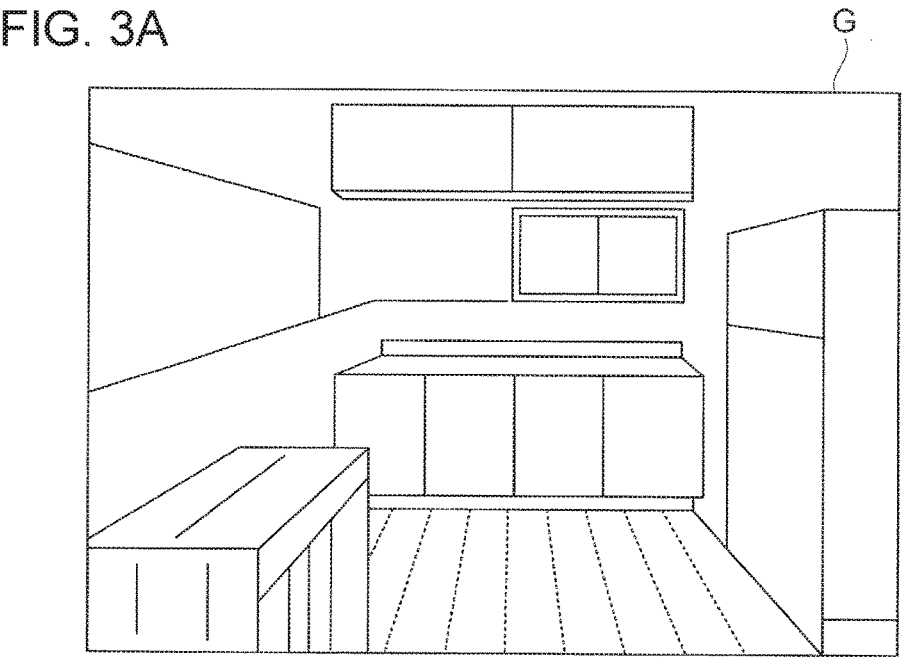
FIGS. 3A to 3B are diagrams illustrating an example of a method for user-interactively performing an operation for specifying a region as a specified region.
Figure 3B:
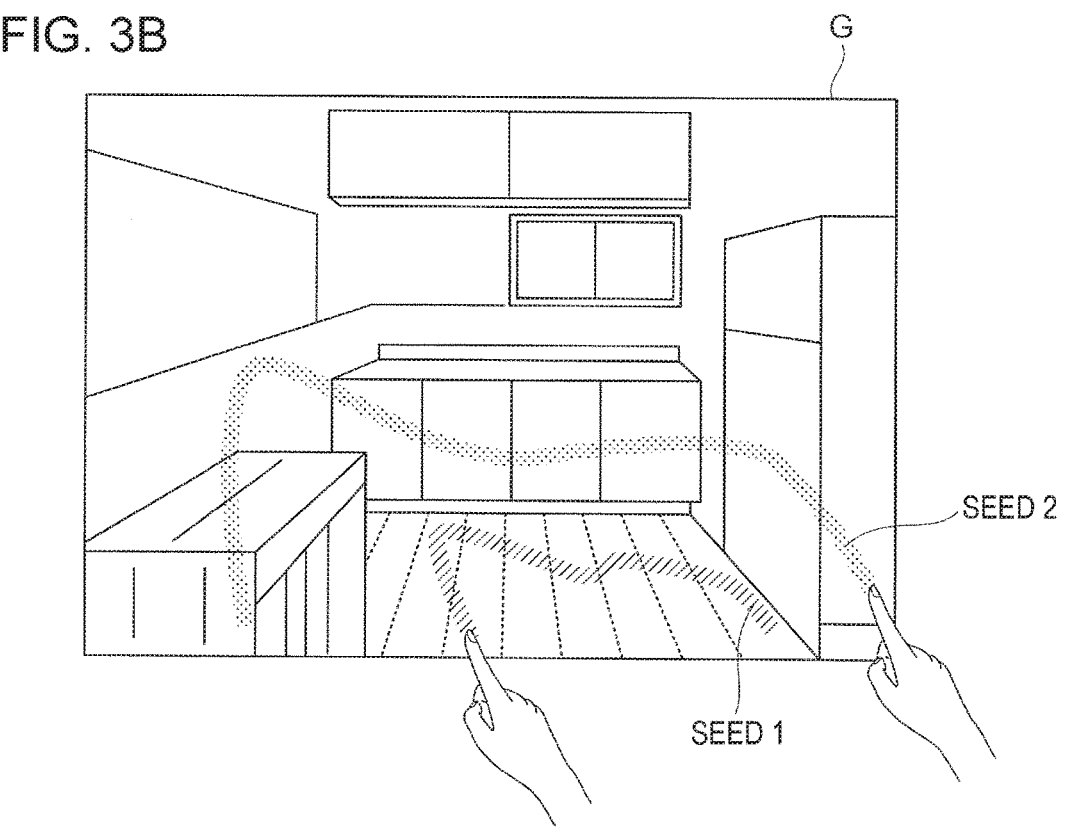

FIGS. 3A to 3B are diagrams illustrating an example of the method for user-interactively performing the operation for specifying a region as a specified region.

FIG. 3A illustrates the case where an image displayed on the display screen 21 of the display apparatus 20 is an image G (original image) that is a picture of the interior of a room. FIG. 3A illustrates the case where the user is going to select, as specified regions, a portion corresponding to the floor serving as the foreground and a portion other than the floor serving as the background. That is, there are two specified regions in this case. Hereinafter the specified region that is the portion corresponding to the floor may also be referred to as "first specified region", and the specified region that is the portion other than the floor may also be referred to as "second specified region".

The user assigns representative paths to the respective specified regions. Each path may be input using the input device 30. Specifically, in the case where the input device 30 is a mouse, the path is drawn by dragging the mouse on the image G displayed on the display screen 21 of the display apparatus 20. In the case where the input device 30 is a touch panel, the path is similarly drawn by performing tracing and swiping on the image G using for example the user's finger or a touch pen. Note that the path may be given as dots instead. That is, the user gives information indicating representative positions of the respective specified regions. In other words, the user inputs position information indicating the representative positions of the specified regions. Note that hereinafter these paths, dots, or the like may also be referred to as "seeds".

FIG. 3B illustrates an example in which seeds are drawn on the image G of FIG. 3A. In FIG. 3B, a seed is drawn in each of the portion corresponding to the floor and the portion other than the floor. Note that hereinafter the seed drawn in the portion corresponding to the floor serving as the foreground may also be referred to as "seed 1", and the seed drawn in the portion other than the floor serving as the background may also be referred to as "seed 2".

The region detection unit 13 detects, on the basis of the position information regarding the seeds, specified regions from the image G (original image) displayed by the display apparatus 20.

To cut out the specified regions on the basis of the position information regarding the seeds, the region detection unit 13 first adds labels to pixels where the seeds are drawn. In the example illustrated in FIG. 3B, a "label 1" is added to the pixels corresponding to the seed 1 drawn on the portion corresponding to the floor, and a "label 2" is added to the pixels corresponding to the seed 2 drawn on the portion other than the floor. The addition of labels in this manner is called "labeling" in the present exemplary embodiment.

The specified regions are cut out using a region expansion method. By using the region expansion method, a region is expanded by repeatedly performing for example an operation for coupling a pixel among pixels on which a seed is drawn and its neighboring pixel when the difference between pixel values of the pixel and the neighboring pixel is small and for not coupling the pixels when the difference is large.

Figure 4:
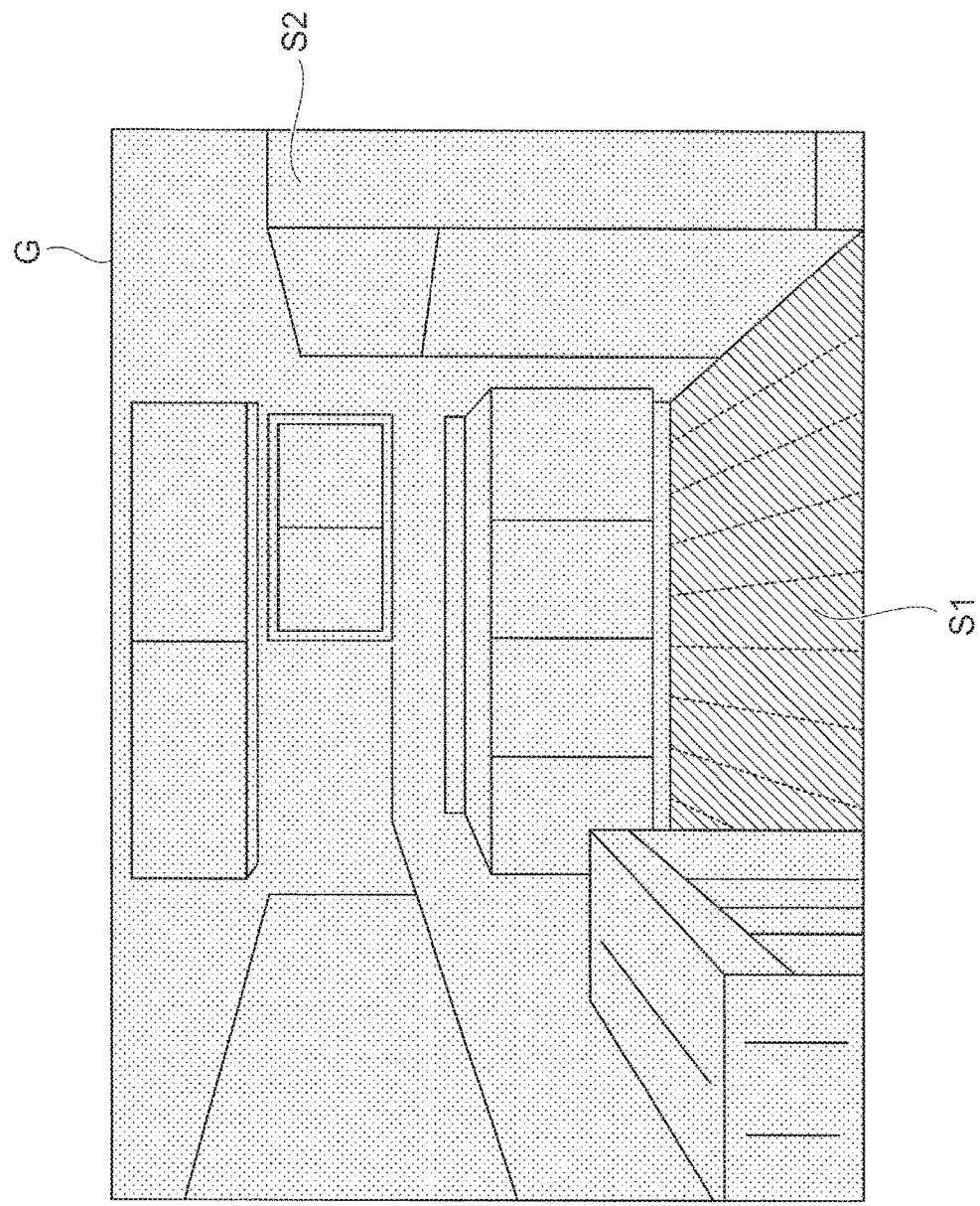
FIG. 4 is a diagram illustrating a result of cutting out specified regions from an image of FIG. 3A using a region expansion method.

FIG. 4 is a diagram illustrating a result of cutting out the specified regions from the image G of FIG. 3A using the region expansion method.

As illustrated in FIG. 4, two specified regions, a first specified region S1 and a second specified region S2, are cut out as the specified regions.

The sample-image acquisition unit 14 acquires image information regarding a sample image that is an image serving as a sample. In this case, the image information regarding the sample image is stored in the sample-image memory 15. For example, the user issues a command to select any of sample images stored in the sample-image memory 15. As a result, the sample-image acquisition unit 14 accesses the sample-image memory 15 and acquires a sample image. However the way in which a sample image is acquired is not limited to the one described above. For example, the user may input image information regarding a sample image to the image processing apparatus 10, and as a result the sample-image acquisition unit 14 may acquire the image information regarding the sample image.

Figure 5A:
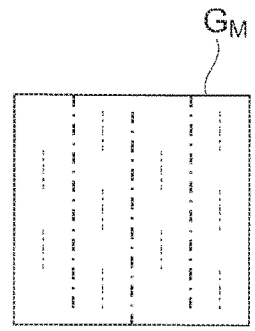
FIGS. 5A to 5C are diagrams about a sample image.
Figure 5B:
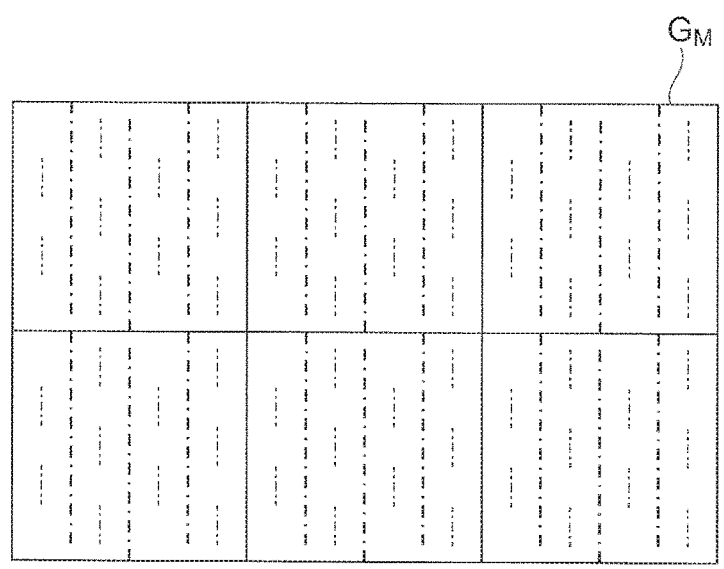
Figure 5C:
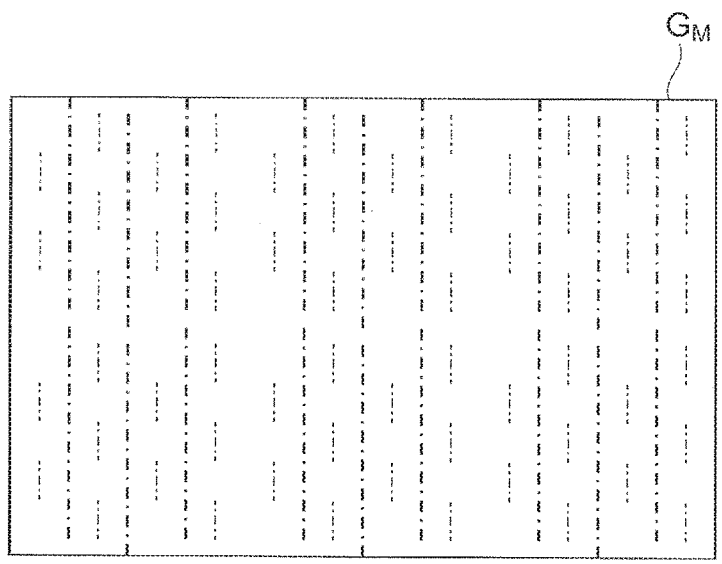

FIGS. 5A to 5C are diagrams about a sample image.

FIG. 5A illustrates an example of a sample image $G_M$. The sample image $G_M$ has a rectangular shape and has a texture in which broken lines are aligned and arranged as illustrated in FIG. 5A. Note that the texture of the sample image $G_M$ is, for example, a combination of colors, bumps and dips, and the level of shading.

FIG. 5B illustrates an example in which six (2×3=6) of the sample image $G_M$ of FIG. 5A are aligned. FIG. 5C illustrates an example of a new sample image $G_M$ obtained by performing quilting on the junctures of the sample images $G_M$ of FIG. 5B. That is, even when the sample image $G_M$ is a small image as illustrated in FIG. 5A, a larger sample image $G_M$ may be generated by performing quilting on the sample images $G_M$ as illustrated in FIGS. 5B to 5C. As a result, the case where a specified region is larger than the sample image $G_M$ acquired by the sample-image acquisition unit 14 may be handled in after-mentioned processing performed by the image composing unit 17.

The image processing unit 16 performs image processing on a selected specified region. Specifically, the image processing unit 16 deforms the shape of the sample image $G_M$ in accordance with the shape of the specified region and deforms the texture of the sample image $G_M$ so as to express the depth corresponding to the specified region.

The image composing unit 17 overlays the sample image $G_M$ deformed by the image processing unit 16 on the specified region of the image G.

FIG. 6 illustrates an example of a composite image G' obtained by overlaying the sample image $G_M$ on the specified region of the image G using an existing method.

In this case, FIG. 6 illustrates the case where the sample image $G_M$ is overlaid on the first specified region S1 corresponding to the portion corresponding to the floor serving as the foreground.

As illustrated in FIG. 6, the texture of the sample image $G_M$ is reflected in the first specified region S1, and it may be seen that the texture of the floor is changed to the texture of the sample image $G_M$. Note that the sense of depth of the texture of the sample image $G_M$ does not match that of the image G and thus the image G' looks unnatural.

The image processing unit 16 deforms the sample image $G_M$ so as to be able to express a certain depth in the present exemplary embodiment, and as a result the sense of depth of the image G is expressed.

As a method for this deformation, for example, the coordinates of the pixels of the sample image $G_M$ may be transformed by performing an affine transformation.

An affine transformation is a transformation obtained by combining a parallel displacement and a linear transformation, and may be expressed as in Math 1 below. Math 1 is a mathematical expression for transforming the coordinates (x, y) of the pixels of a sample image $G_M$ before an affine transformation into the coordinates (x', y') of the pixels of a sample image $G_M$ after the affine transformation. In Math 1, a, b, c, d, e, and f are affine transformation coefficients.

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad \text{[Math 1]}$$

Figure 7:
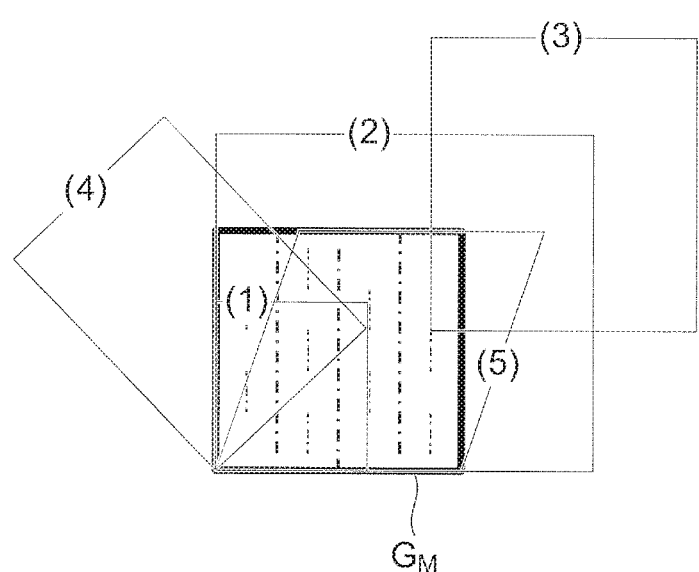
FIG. 7 is a diagram in which a pre-affine-transformation sample image is compared with post-affine-transformation sample images.

FIG. 7 is a diagram in which a pre-affine-transformation sample image $G_M$ is compared with post-affine-transformation sample images $G_M$. In this case, the pre-affine-transformation sample image $G_M$ is represented with a bold line, and the post-affine-transformation sample images $G_M$ are represented with (1) to (5). Note that, for (1) to (5), only the outlines of the post-affine-transformation sample images $G_M$ are illustrated for the sake of clarity.

Among (1) to (5), (1) illustrates an example obtained by reducing the pre-affine-transformation sample image $G_M$. In this case, the post-affine-transformation sample image $G_M$ does not change in shape and is reduced in size with respect to the pre-affine-transformation sample image $G_M$. In addition, (2) illustrates an example obtained by enlarging the pre-affine-transformation sample image $G_M$. In this case, the post-affine-transformation sample image $G_M$ does not change in shape and is increased in size with respect to the pre-affine-transformation sample image $G_M$. Furthermore, (3) illustrates an example obtained by parallel displacing the pre-affine-transformation sample image G. In this case, the post-affine-transformation sample image $G_M$ does not change in shape nor in size with respect to the pre-affine-transformation sample image $G_M$, but the positions of the pixels included in the pre-affine-transformation sample image $G_M$ are changed by the same distance in the same direction. Furthermore, (4) illustrates an example obtained by rotating the pre-affine-transformation sample image $G_M$. In this case, the post-affine-transformation sample image $G_M$ does not change in shape nor in size with respect to the pre-affine-transformation sample image $G_M$, but the positions of the pixels included in the pre-affine-transformation sample image $G_M$ are rotated about a certain point serving as the center by a predetermined angle. Furthermore, (5) illustrates an example obtained by skewing (shearing) the pre-affine-transformation sample image $G_M$. In this case, the shape of the post-affine-transformation sample image $G_M$ is a parallelogram.

The shape of the sample image $G_M$ may be changed in accordance with the shape of the specified region by adjusting the affine transformation coefficients a, b, c, d, e, and f.

As another deformation method, for example, the coordinates of the pixels of the sample image $G_M$ may be transformed by performing a projective transformation.

A projective transformation may be expressed as in Math 2 below. Math 2 is a mathematical expression for transforming the coordinates (x, y) of the pixels of a sample image $G_M$ before a projective transformation into the coordinates (u, v) of the pixels of a sample image $G_M$ after the projective transformation. In Math 2, a, b, c, d, e, f, g, and h are transformation coefficients.

$$\binom{u}{v} = \binom{(ax+by+c)/(gx+hy+1)}{(dx+ey+f)/(gx+hy+1)} \quad \text{[Math 2]}$$

Since the transformation coefficients a, b, c, d, e, f, g, and h are eight unknowns, it is sufficient that at least four correspondence relationships are found out from before to after the transformation. Math 2 is thus deformed into Math 3 as in the following.

$$\binom{u}{v} = \binom{ax+by+c-gxu-hyu}{dx+ey+f-gxv-hyv} \quad \text{[Math 3]}$$

Since Math 3 includes two equations, when four pairs of correspondence relationships about (x, y) and (u, v) are given, eight equations are obtained. As a result, the eight unknowns that are the transformation coefficients a, b, c, d, e, f, g, and h are determined.

FIGS. 8A to 8B are diagrams in which a pre-projective-transformation sample image $G_M$ is compared with post-projective-transformation sample images $G_M$.

In this case, FIG. 8A illustrates the pre-projective-transformation sample image $G_M$, and FIG. 8B illustrates the post-projective-transformation sample images $G_M$. As illustrated in FIG. 8B, the shapes of the post-projective-transformation sample images $G_M$ are trapezoids.

Figure 9A:
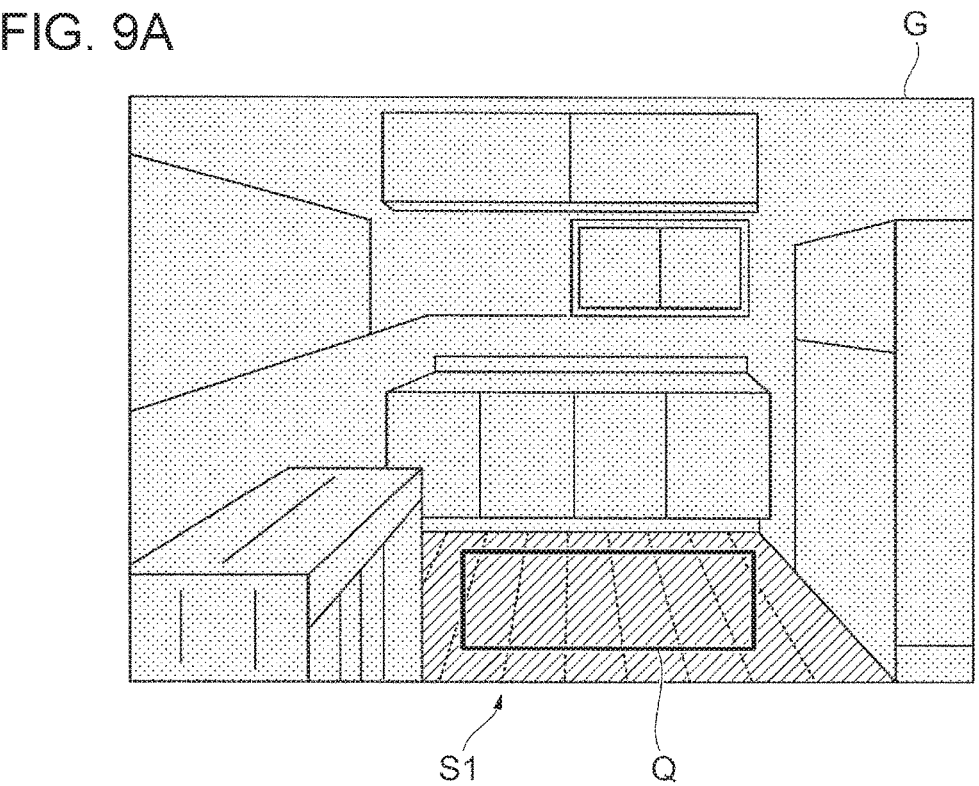
FIGS. 9A to 9B are diagrams illustrating a first example of a method with which a user actually changes the shape of a sample image in accordance with the shape of a specified region.
Figure 9B:
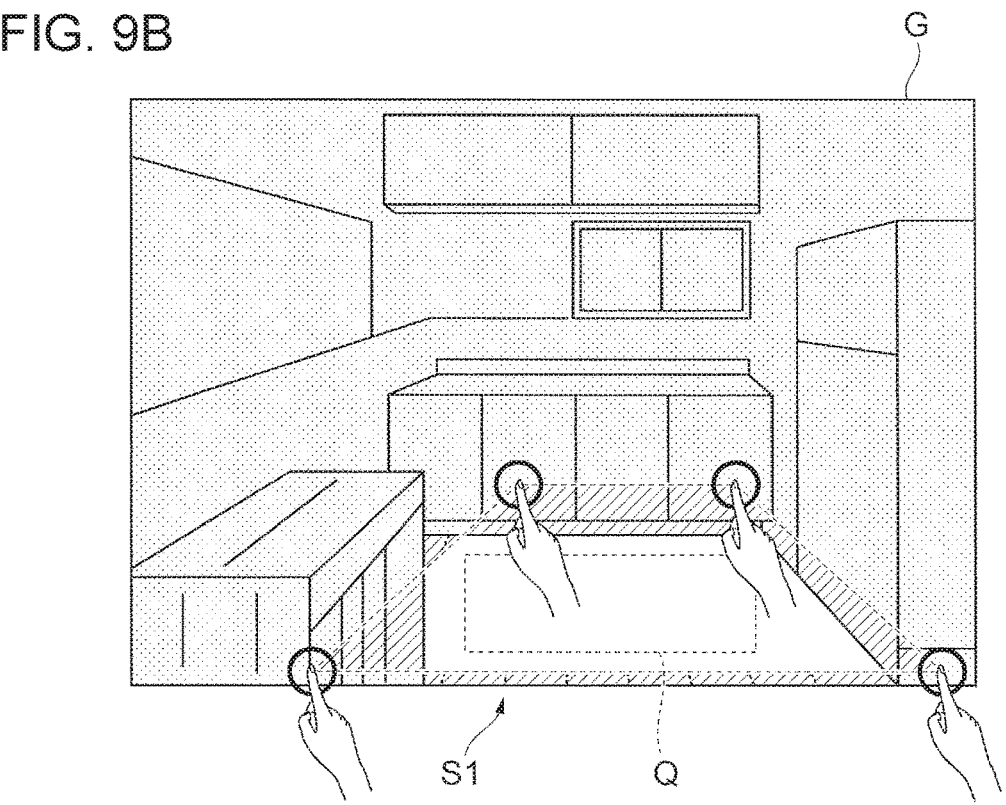

FIGS. 9A to 9B are diagrams illustrating a first example of a method with which the user actually changes the shape of the sample image $G_M$ in accordance with the shape of a specified region.

In this case, a reference rectangle Q is set in the image G displayed on the display screen 21, and the user deforms the reference rectangle Q. The reference rectangle Q is a figure used as the reference for deformation of the sample image $G_M$. When the user deforms the reference rectangle Q, the shape of the sample image $G_M$ changes with the deformation of the reference rectangle Q. In this case, the image processing unit 16 determines, in accordance with the degree to which the user has deformed the reference rectangle Q, the degree to which the shape and texture of the sample image $G_M$ is to be deformed.

FIG. 9A illustrates the case where the reference rectangle Q is displayed in the image G. The user deforms the reference rectangle Q by changing the positions of four vertexes of the reference rectangle Q. In this case, the user command reception unit 12 acquires information for changing the positions of the four vertexes as the user command information. The image processing unit 16 deforms the reference rectangle Q in the image G, and furthermore deforms the sample image $G_M$ in response to the deformation of the reference rectangle Q. The deformed reference rectangle Q and the deformed sample image $G_M$ are displayed in the image G displayed on the display screen 21.

In this case, the user specifies any one of the four vertexes of the reference rectangle Q and thereafter specifies a point in the image G. The point indicates the position to which the specified vertex is to be moved. Furthermore the user performs substantially the same processing for the other three vertexes, which are other than the specified vertex. That is, the user specifies four points in total in the image G as the positions to which the four vertexes of the reference rectangle Q are to be moved.

FIG. 9B is a diagram illustrating the specification of four points in the image G. The user may determine the positions to which the four vertexes of the reference rectangle Q are to be moved and deform the reference rectangle Q through this operation. The degree to which the shape of the sample image $G_M$ is to be deformed may be adjusted in accordance with the positions of the four points in the image G. In other words, the degree to which the sample image $G_M$ is to be distorted may be adjusted.

In the case where the input device 30 is a mouse, the user specifies the four points by clicking on the image G displayed on the display screen 21 of the display apparatus 20 through operation of the mouse. In the case where the input device 30 is a touch panel, the user specifies the four points by tapping the image G using for example the user's finger or a touch pen.

As illustrated in FIG. 10, the four vertexes of the reference rectangle Q may be directly moved through dragging of the mouse or through swiping using for example the user's finger or a touch pen.

Figure 11A:
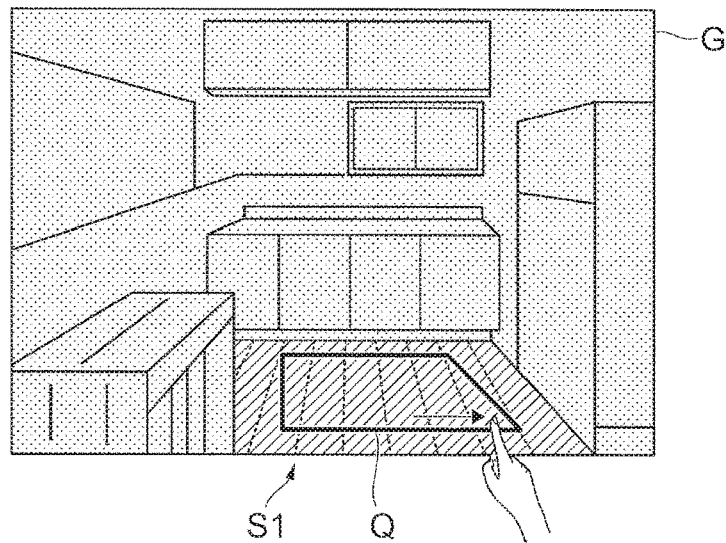
FIGS. 11A to 11C are diagrams illustrating a second example of the method with which the user actually changes the shape of the sample image in accordance with the shape of the specified region.
Figure 11B:
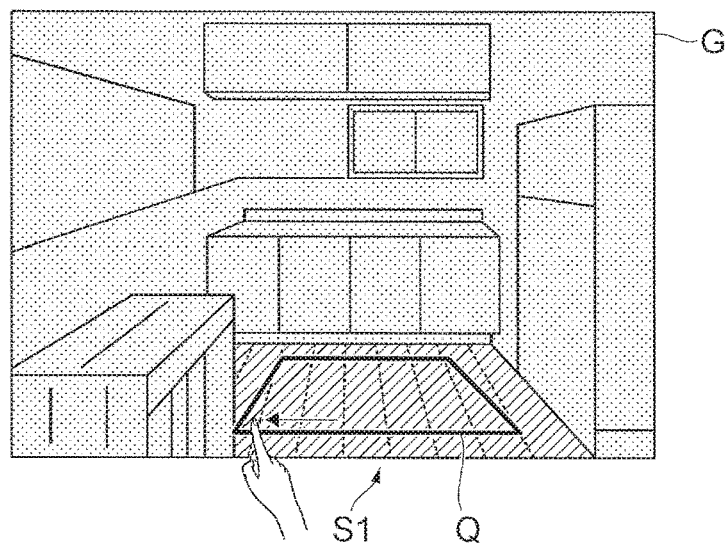
Figure 11C:
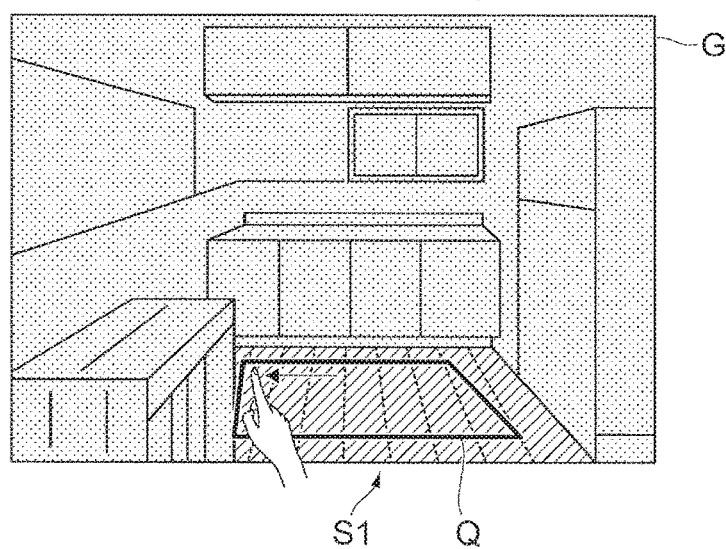

FIGS. 11A to 11C are diagrams illustrating a second example of the method with which the user actually changes the shape of the sample image $G_M$ in accordance with the shape of the specified region.

The reference rectangle Q is also used in this case, and the shape of the sample image $G_M$ is changed through deformation of the reference rectangle Q, the deformation being performed by the user. Note that an operation for deforming the reference rectangle Q differs from the operation described in the first example. In this case, a direction is specified along any one of the four sides of the reference rectangle Q, and the position of a vertex located in the direction is changed.

FIG. 11A illustrates the case where the lower region of the reference rectangle Q is dragged using the mouse or is swiped using for example the user's finger or a touch pen toward the right along the lower side of the reference rectangle Q. A direction along the lower side of the reference rectangle Q is specified thorough this drag operation or swipe operation. In this case, this drag operation or swipe operation corresponds to an operation for moving the lower right vertex of the reference rectangle Q located in this direction, and the lower right portion of the reference rectangle Q expands.

FIG. 11B illustrates the case where, after the operation of FIG. 11A, the lower region of the reference rectangle Q is dragged using the mouse or is swiped using for example the user's finger or a touch pen toward the left along the lower side of the reference rectangle Q. Similarly to as in FIG. 11A, the other direction along the lower side of the reference rectangle Q is specified thorough this drag operation or swipe operation. In this case, this drag operation or swipe operation corresponds to an operation for moving the lower left vertex of the reference rectangle Q located in this direction, and the lower left portion of the reference rectangle Q expands.

Furthermore, FIG. 11C illustrates the case where, after the operation of FIG. 11B, the upper region of the reference rectangle Q is dragged using the mouse or is swiped using for example the user's finger or a touch pen toward the left along the upper side of the reference rectangle Q. A direction along the upper side of the reference rectangle Q is specified thorough this drag operation or swipe operation. In this case, this drag operation or swipe operation corresponds to an operation for moving the upper left vertex of the reference rectangle Q located in this direction, and the upper left portion of the reference rectangle Q expands. Note that when the upper region of the reference rectangle Q is for example dragged toward the right along the upper side of the reference rectangle Q, the operation corresponds to an operation for moving the upper right vertex of the reference rectangle Q, and the upper right portion of the reference rectangle Q expands.

In the cases of FIGS. 11A to 11C, the use of the lower or upper side of the reference rectangle Q causes a drag or swipe operation to correspond to an operation for moving a vertex of the reference rectangle Q toward the right or left. Note that not only the lower and upper sides of the reference rectangle Q but also the left and right sides of the reference rectangle Q may also be used. In this case, a drag or swipe operation corresponds to an operation for moving a vertex of the reference rectangle Q upward or downward.

Figure 12:
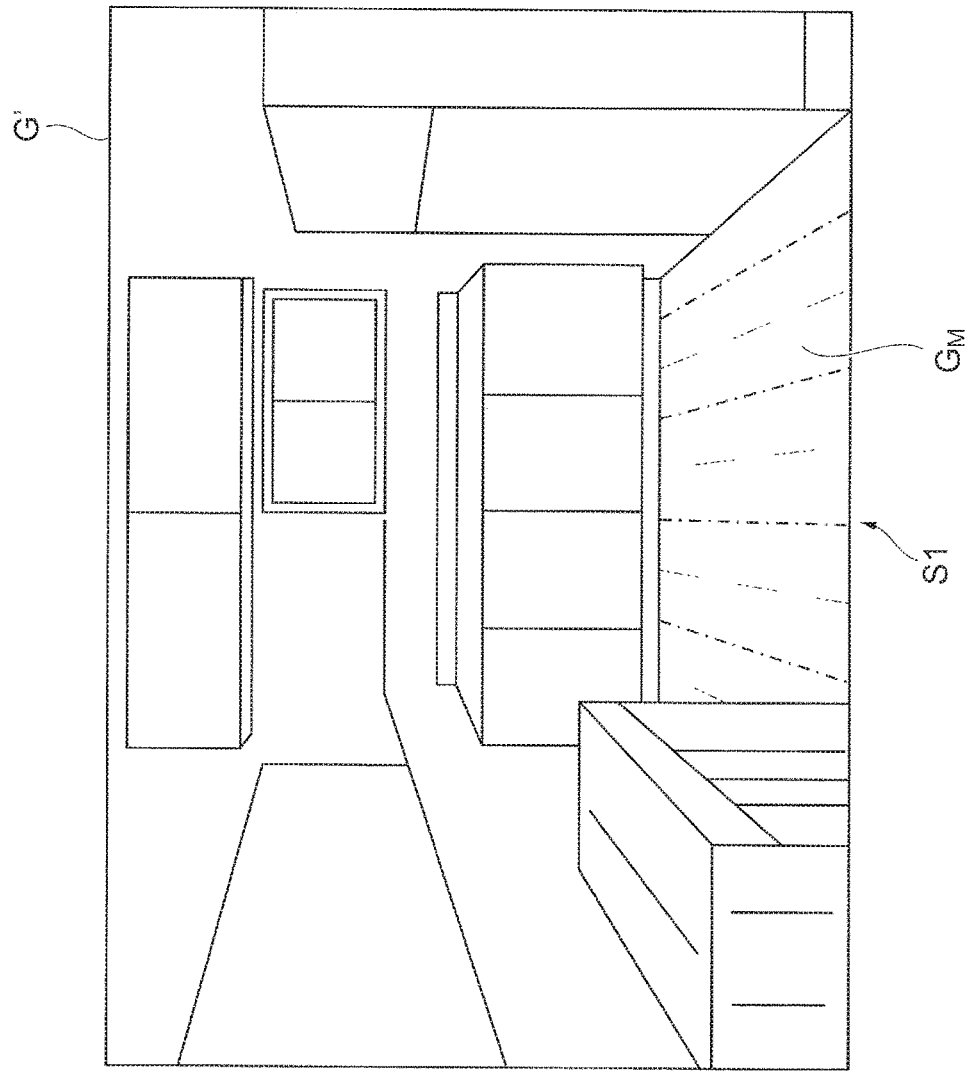
FIG. 12 illustrates a composite image after the sample image deformed by an image processing unit is overlaid on the specified region of the image.

FIG. 12 illustrates a composite image G' obtained after the sample image $G_M$ deformed by the image processing unit 16 is overlaid on the specified region of the image G.

As illustrated in FIG. 12, the first specified region S1 is replaced with the deformed sample image $G_M$. The texture of the sample image $G_M$ is reflected in the composite image G' similarly to as in the composite image G' illustrated in FIG. 6, and the texture of the floor is the texture of the sample image $G_M$. Unlike FIG. 6, the texture expresses depth. The sense of depth of the texture of the sample image $G_M$ matches that of the image G, and thus the composite image G' seems natural.

Returning to FIG. 2, the image-information output unit 18 outputs image information obtained after the image processing has been performed as above. The image information obtained after the image processing has been performed is sent to the display apparatus 20. The display screen 21 of the display apparatus 20 displays an image on the basis of the image information.

Next, an operation of the image processing apparatus 10 will be described.

Figure 13:
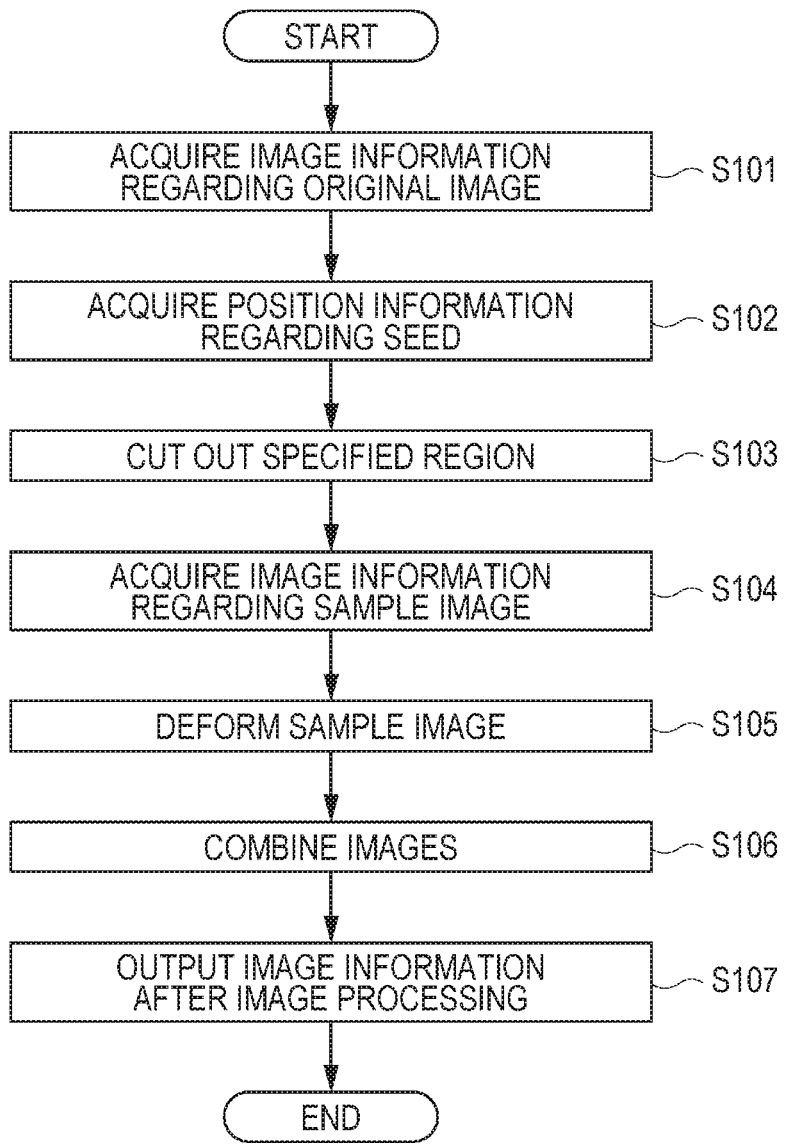
FIG. 13 is a flowchart for describing an operation of the image processing apparatus.

FIG. 13 is a flowchart for describing the operation of the image processing apparatus 10.

First, the image-information acquisition unit 11 acquires image information regarding an image G (original image) on which image processing is to be performed (step 101).

Next, the user command reception unit 12 acquires position information regarding a seed that the user has drawn on the image G (step 102).

The region detection unit 13 cuts out a specified region on the basis of the position information regarding the seed (step 103).

The sample-image acquisition unit 14 acquires, in accordance with a command from the user, image information regarding a sample image $G_M$ from the sample-image memory 15 (step 104).

Next, the image processing unit 16 deforms the shape of the sample image $G_M$ in accordance with the shape of the specified region, and deforms the texture of the sample image $G_M$ so as to express the depth corresponding to the specified region (step 105).

Furthermore, the image composing unit 17 overlays the sample image $G_M$ deformed by the image processing unit 16 on the specified region of the image G (step 106).

The image-information output unit 18 then outputs image information obtained after the image processing has been performed as above (step 107).

Note that the process performed by the image processing apparatus 10 described above may also be determined as an image processing method having a region detection step for detecting a specified region from an original image (image G), an image processing step for deforming the shape of a sample image $G_M$ that is an image serving as a sample in accordance with the shape of the specified region and for deforming the texture of the sample image $G_M$ so as to express the depth corresponding to the specified region, and an image composing step for overlaying the deformed sample image $G_M$ on the specified region of the original image.

Example of Hardware Configuration of Image Processing Apparatus

Next, a hardware configuration of the image processing apparatus 10 will be described.

Figure 14:
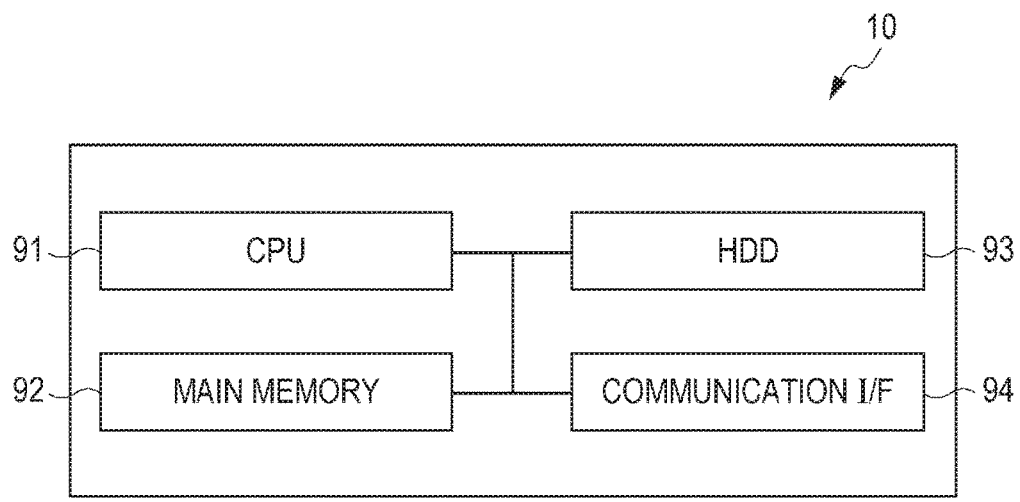
FIG. 14 is a diagram illustrating a hardware configuration of the image processing apparatus.

FIG. 14 is a diagram illustrating a hardware configuration of the image processing apparatus 10.

The image processing apparatus 10 is realized by, for example, a personal computer as described above. As illustrated in FIG. 14, the image processing apparatus 10 includes a central processing unit (CPU) 91 serving as a computation unit, a main memory 92 serving as a memory, and a hard disk drive (HDD) 93. In this case, the CPU 91 executes various programs such as an OS and application software. The main memory 92 is a storage area for storing for example various programs and data for execution of the various programs, and the HDD 93 is a storage area for storing for example input data for various programs and output data from various programs.

Furthermore, the image processing apparatus 10 has a communication interface (hereinafter written as "communication I/F") 94 for communicating with the outside.

Description of Program

The process performed by the image processing apparatus 10 according to the present exemplary embodiment described above is for example prepared as a program such as application software.

Thus, in the present exemplary embodiment, the image processing apparatus 10 may also be determined as a program causing a computer to realize a region detection function for detecting a specified region from an original image (image G), an image processing function for deforming the shape of a sample image $G_M$ that is an image serving as a sample in accordance with the shape of the specified region and for deforming the texture of the sample image $G_M$ so as to express the depth corresponding to the specified region, and an image composing function for overlaying the deformed sample image $G_M$ on the specified region of the original image.

Note that the program realizing the present exemplary embodiment may be provided by a communication unit and may also be stored in a recording medium such as a CD-ROM and then provided.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   at least one processor configured to execute:
      a region detection unit that detects a specified region from an original image;
      an image processing unit that deforms a shape of a sample image that is an image serving as a sample in accordance with a shape of the specified region and deforms a texture of the sample image so as to express a depth corresponding to the specified region; and
      an image composing unit that overlays the deformed sample image on the specified region of the original image.

2. The image processing apparatus according to claim 1, wherein the image processing unit deforms the shape and texture of the sample image by performing an affine transformation or a projective transformation on coordinates of pixels of the sample image.

3. The image processing apparatus according to claim 2, wherein the image processing unit generates a larger sample image by performing quilting on sample images each of which is equivalent to the sample image.

4. The image processing apparatus according to claim 3, wherein the image processing unit sets a reference rectangle serving as a reference for deformation of the sample image, and determines, in accordance with a degree to which a user deforms the reference rectangle, a degree to which the shape and texture of the sample image are to be deformed.

5. The image processing apparatus according to claim 4, wherein the image processing unit deforms the reference rectangle by changing positions of four vertexes of the reference rectangle.

6. The image processing apparatus according to claim 2, wherein the image processing unit sets a reference rectangle serving as a reference for deformation of the sample image, and determines, in accordance with a degree to which a user deforms the reference rectangle, a degree to which the shape and texture of the sample image are to be deformed.

7. The image processing apparatus according to claim 6, wherein the image processing unit deforms the reference rectangle by changing positions of four vertexes of the reference rectangle.

8. The image processing apparatus according to claim 7, wherein the image processing unit changes the positions of the four vertexes of the reference rectangle by specifying any one of the four vertexes of the reference rectangle, thereafter specifying a position to which the specified vertex is to be moved, and furthermore performing substantially the same processing for the other three vertexes other than the specified vertex.

9. The image processing apparatus according to claim 7, wherein the image processing unit specifies a direction along any one of four sides of the reference rectangle and changes a position of a vertex located in the direction.

10. The image processing apparatus according to claim 1, wherein the image processing unit generates a larger sample image by performing quilting on sample images each of which is equivalent to the sample image.

11. The image processing apparatus according to claim 10, wherein the image processing unit sets a reference rectangle serving as a reference for deformation of the sample image, and determines, in accordance with a degree to which a user deforms the reference rectangle, a degree to which the shape and texture of the sample image are to be deformed.

12. The image processing apparatus according to claim 11, wherein the image processing unit deforms the reference rectangle by changing positions of four vertexes of the reference rectangle.

13. The image processing apparatus according to claim 12, wherein the image processing unit changes the positions of the four vertexes of the reference rectangle by specifying any one of the four vertexes of the reference rectangle, thereafter specifying a position to which the specified vertex is to be moved, and furthermore performing substantially the same processing for the other three vertexes other than the specified vertex.

14. The image processing apparatus according to claim 12, wherein the image processing unit specifies a direction along any one of four sides of the reference rectangle and changes a position of a vertex located in the direction.

15. The image processing apparatus according to claim 1, wherein the image processing unit sets a reference rectangle serving as a reference for deformation of the sample image, and determines, in accordance with a degree to which a user deforms the reference rectangle, a degree to which the shape and texture of the sample image are to be deformed.

16. The image processing apparatus according to claim 15, wherein the image processing unit deforms the reference rectangle by changing positions of four vertexes of the reference rectangle.

17. The image processing apparatus according to claim 16, wherein the image processing unit changes the positions of the four vertexes of the reference rectangle by specifying any one of the four vertexes of the reference rectangle, thereafter specifying a position to which the specified vertex is to be moved, and furthermore performing substantially the same processing for the other three vertexes other than the specified vertex.

18. The image processing apparatus according to claim 16, wherein the image processing unit specifies a direction along any one of four sides of the reference rectangle and changes a position of a vertex located in the direction.

19. An image processing system comprising:
   a display configured to display an image; and
   an image processing apparatus comprising at least one processor configured to perform image processing on image information regarding the image displayed by the display,
   wherein the at least one processor is configured to execute:
      a region detection unit that detects a specified region from an original image;

an image processing unit that deforms a shape of a sample image that is an image serving as a sample in accordance with a shape of the specified region and deforms a texture of the sample image so as to express a depth corresponding to the specified region; and an image composing unit that overlays the deformed sample image on the specified region of the original image.

20. A non-transitory computer readable medium storing a program causing a computer to execute a process, the process comprising:

detecting a specified region from an original image;

deforming a shape of a sample image that is an image serving as a sample in accordance with a shape of the specified region;

deforming a texture of the sample image so as to express a depth corresponding to the specified region; and overlaying the deformed sample image on the specified region of the original image.

* * * * *